United States Patent
Kuhns

[19]

[11] Patent Number: 6,071,053
[45] Date of Patent: Jun. 6, 2000

[54] STICK OF FASTENERS

[76] Inventor: Philip A. Kuhns, P.O. Box 127, Westmoreland, Tenn. 37186

[21] Appl. No.: 09/342,939

[22] Filed: Jun. 29, 1999

Related U.S. Application Data

[62] Division of application No. 09/156,419, Sep. 18, 1998, Pat. No. 5,941,652, which is a continuation of application No. 08/692,765, Aug. 6, 1996, Pat. No. 5,846,019.

[51] Int. Cl.[7] ............................. F16B 15/00; F16B 15/08
[52] U.S. Cl. ............................ 411/442; 411/920; 206/345
[58] Field of Search .................................. 411/442, 443, 411/444, 920; 206/345, 346

[56] References Cited

U.S. PATENT DOCUMENTS

| | | | |
|---|---|---|---|
| 1,282,845 | 10/1918 | Johnson | 411/920 X |
| 2,092,807 | 7/1937 | La Chapelle . | |
| 2,351,045 | 6/1944 | Heller | 411/920 X |
| 2,351,608 | 6/1944 | Greenwood | 411/920 X |
| 2,380,655 | 7/1945 | Lang | 411/920 X |
| 3,266,138 | 8/1966 | Tipper | 411/920 X |
| 3,583,663 | 6/1971 | Snow, Jr. . | |
| 3,584,347 | 6/1971 | Klenz | 411/920 X |
| 3,618,447 | 11/1971 | Goins | 411/920 X |
| 3,757,629 | 9/1973 | Schneider | 411/920 X |
| 3,788,187 | 1/1974 | Knohl . | |
| 3,813,985 | 6/1974 | Perkins . | |
| 4,087,035 | 5/1978 | Harmon . | |
| 4,327,858 | 5/1982 | Powers . | |
| 4,331,277 | 5/1982 | Green . | |
| 4,380,312 | 4/1983 | Landrus . | |
| 4,505,273 | 3/1985 | Braun et al. | 411/457 X |
| 4,526,174 | 7/1985 | Froehlich | 411/457 X |
| 4,570,841 | 2/1986 | Olesen . | |
| 4,573,625 | 3/1986 | Olesen et al. . | |
| 4,574,992 | 3/1986 | Holman . | |
| 4,787,387 | 11/1988 | Burbank, III et al. | 411/457 X |
| 4,836,372 | 6/1989 | Shelton | 411/442 X |
| 4,978,045 | 12/1990 | Murakami et al. . | |
| 5,014,897 | 5/1991 | Uuskallio . | |
| 5,060,468 | 10/1991 | Matsutani et al. | 411/457 X |
| 5,360,305 | 11/1994 | Kerrigan . | |
| 5,441,373 | 8/1995 | Kish et al. . | |
| 5,466,087 | 11/1995 | Doole | 411/457 X |
| 5,733,085 | 3/1998 | Shida et al. | 411/442 |

FOREIGN PATENT DOCUMENTS

| | | | |
|---|---|---|---|
| 1005249 | 4/1952 | France | 411/457 |
| 1016865 | 11/1952 | France | 411/457 |

OTHER PUBLICATIONS

*Residential Construction Power Fastening Systems,* ITW Paslode, 10 pages, Jul. 1995.
*If You Think All Fasteners Are Alike,* ITW Paslode, 2 pages, Oct. 1990.
*Formwork,* ITW Paslode, 2 pages, Feb. 1991.
*Impulse IM 325,* ITW Paslode, 2 pages, Oct. 1992.
*Fastening Solutions for the Pallet and Crafting Industry,* ITW Paslode, 10 pages, Jan. 1993.
*Construction Product Line Catalog,* Stanley Bostitch, 20 pages, Mar. 1994.
*Powerful New Tools,* Stanley Bostitch, 2 pages, copyright 1994.

*Primary Examiner*—Neill Wilson
*Attorney, Agent, or Firm*—Cook. Alex, McFarron, Manzo, Cummings & Mehler, Ltd.

[57] ABSTRACT

An improved driving element, fastener placement system, method of fastening and combination of fastened workpieces are disclosed which include a generally U-shaped, staple-like fastener having a pair of legs spaced from each other by a crown which transversely extends between the upper ends of the legs to connect the legs to each other adjacent their upper ends and space the upper ends of the legs apart by a given distance. Each of the legs also has an opposite lower end which enter the respective workpieces which are to be fastened together. The fastener is positioned with the lower end of one leg in contact with one of the workpieces and the lower end of the other leg in contact with the other workpiece, and the fastener is then forcibly driven into the respective workpieces by a driving element which acts upon the crown in a manner to attempt or tend to shorten the distance between the upper ends of the legs by bending the crown and countersinking the legs and/or crown into the workpieces. This results in continuing forces which tend to continue to urge the respective workpieces together after the fastener has been driven.

4 Claims, 2 Drawing Sheets

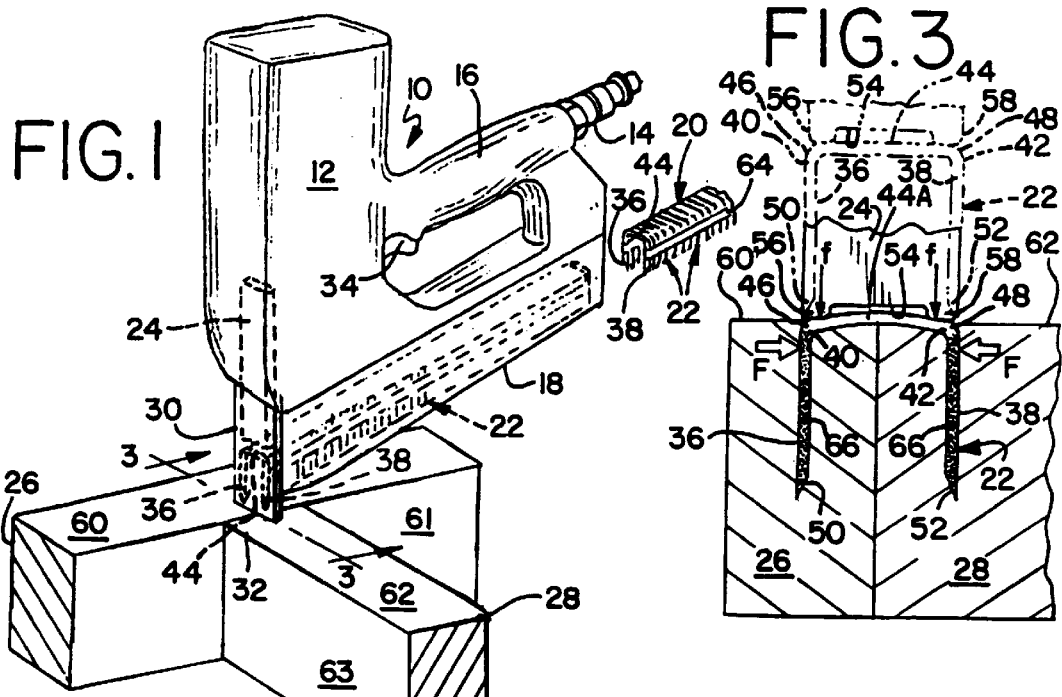
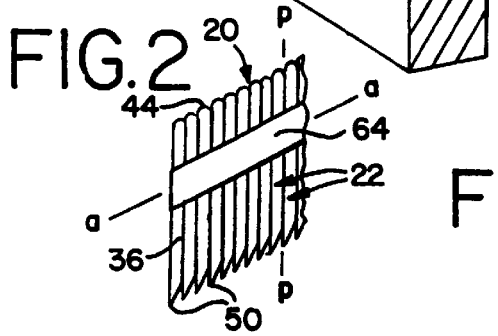
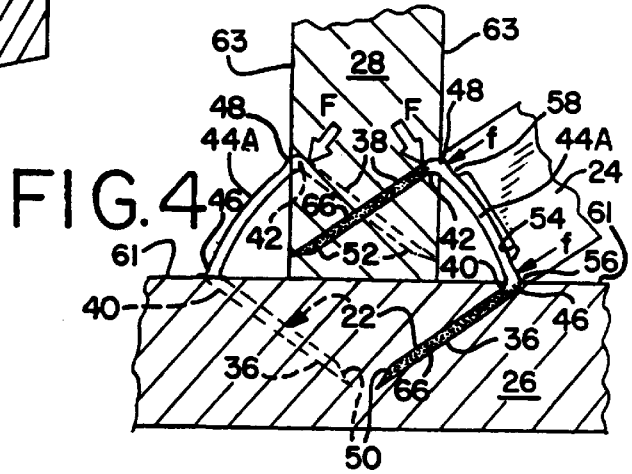
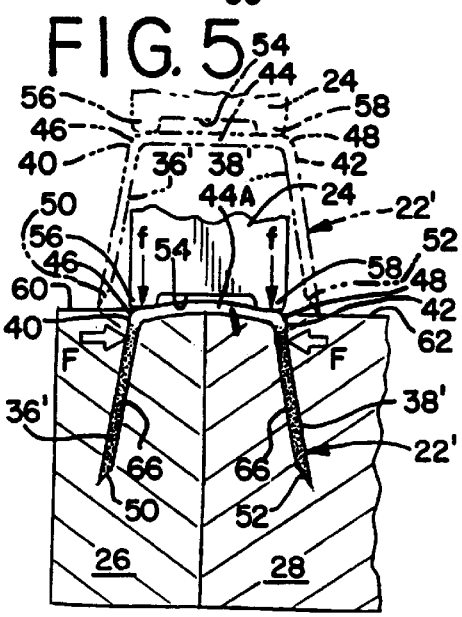
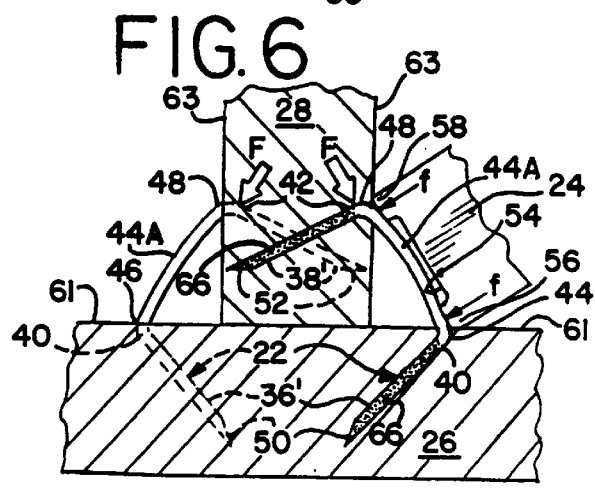

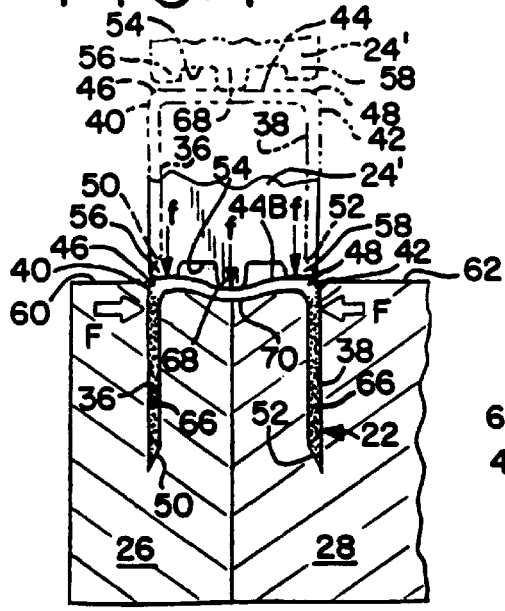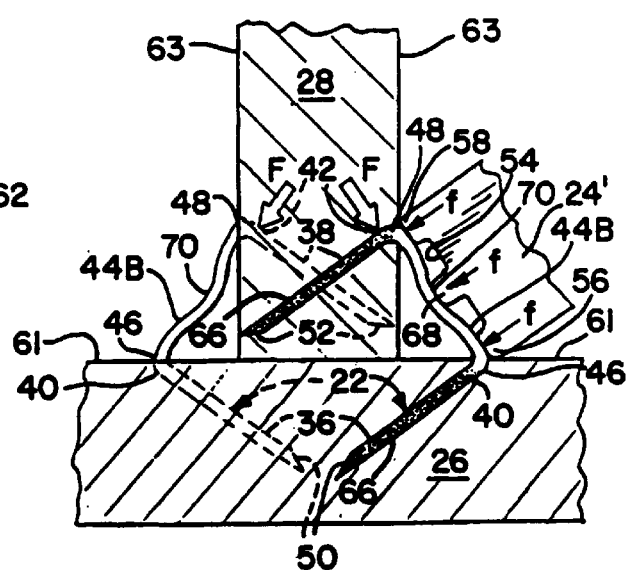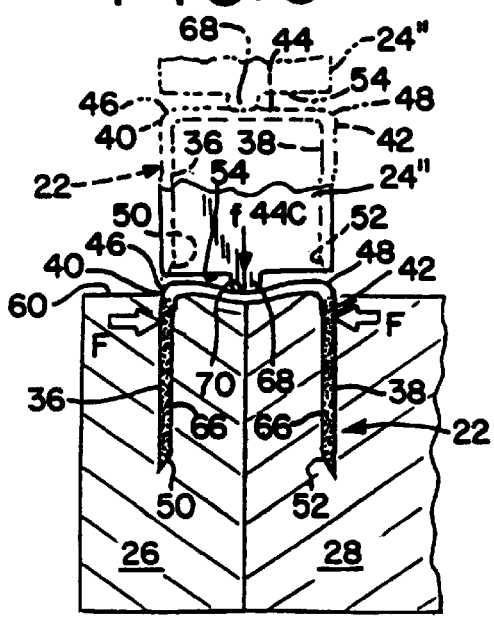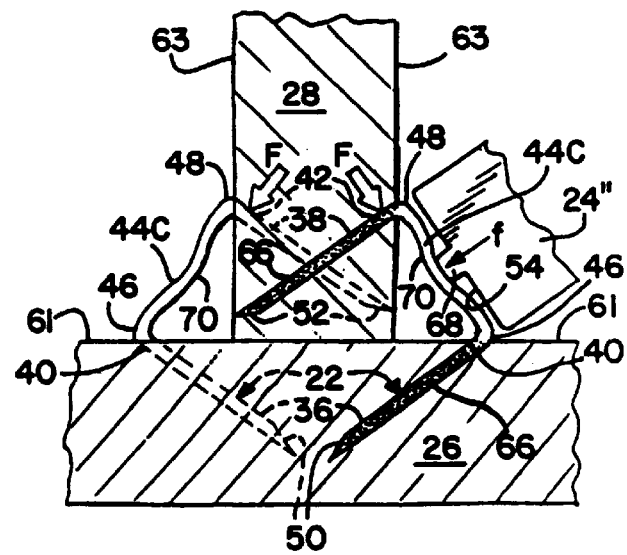

STICK OF FASTENERS

RELATED APPLICATION

This application is a division of application Ser. No. 09/156,419, filed Sep. 18, 1998, now U.S. Pat. No. 5,941,652 which application is a continuation of application Ser. No. 08/692,765, filed Aug. 6, 1996, now U.S. Pat. No. 5,846,019.

BACKGROUND AND SUMMARY OF THE INVENTION

The present invention is directed to fasteners, and more particularly, to fasteners having a generally U-shaped, staple-like construction, to driving elements and fastener placement systems therefor, to sticks of the fasteners, to methods of fastening and to fastened workpieces.

A wide variety of forcibly driven fasteners have been employed in the past for the fastening together of two or more workpieces. Such fasteners have included everything from ordinary construction nails to U-shaped, staple-like fasteners. In some instances in the past a plurality of the fasteners are formed into a stick which can be inserted into a tool for positioning and driving the fasteners into the workpieces which are to be fastened together. During the fastening procedure, the sharp leading ends of the spaced legs of the staple-like fasteners are positioned over at least one of the workpieces to be fastened, and a driving element in the tool is forcibly driven against the crown which joins the legs of one of the staple-like fasteners to separate the leading fastener from a stick of the fasteners, and forcibly drive it into the workpiece or workpieces.

Nails have also been employed in the past in which the nails are adhesively and sequentially attached to each other to form a stick of the nails, the stick is inserted into the magazine of a fastener driving tool in a manner similar to the aforementioned staples, and a driving element of the driving tool contacts and forcibly drives the lead nail in the stick into the workpieces being fastened together.

Although in many of the prior fasteners and fastener systems a force is applied when the fastener is in the process of being forcibly driven into the workpieces which are being fastened, once driving of the fastener has been completed, any forces of substantial magnitude which may have existed during the driving step and which might have tended to urge two workpieces together generally cease. Moreover, neither the configuration of the prior fasteners nor the manner in which they are driven to achieve the fastening function have been generally conducive to exerting any substantial. continuing force which tends to urge the two workpieces together once the fasteners are in place. It would be desirable if a continuing force could be exerted after the driving of a fastener has ceased and which force would tend to urge the two workpieces together in their fastened condition. The existence of such continuing force would among other things firmly hold the workpieces together after fastening and during handling and use of the fastened workpieces. This would substantially reduce any tendency or possibility of relative movement between the two workpieces after they have been fastened together and the possible misalignment or separation of the workpieces due to such movement.

It has been discovered in the present invention that continuing forces advantageously may be simply, easily and readily achieved which tend to urge and hold at least two workpieces together both during the forcible driving of the fastener or fasteners, as well as after the fastener has been forcibly driven and placed in the workpieces. In the present invention these desired continuing forces are achieved by utilizing a U-shaped, staple-like fastener having a pair of legs which are spaced from each other by a crown which transversely extends between the upper ends of the legs to connect the legs to each other adjacent their upper ends, but space the upper ends apart by a given distance. During or at the completion of the driving of the fastener into the workpieces, action is taken on or by the fastener which tends to or attempts to shorten the distance between the upper ends of the legs. This results in the generation and exertion of forces which act to continue to urge the two workpieces together after the placement of the fastener as will be described in further detail to follow. Another advantage of the present invention is that these continuing forces may be easily and readily accomplished utilizing generally previously known and available fasteners, and the desired continuing forces may be accomplished without the need to employ complex or expensive specially constructed tools or procedures.

In one principal aspect of the present invention, an improved driving element, fastener placement system, method of fastening and combination of fastened workpieces comprises a generally U-shaped, staple-like fastener having a pair of legs spaced from each other by a crown which transversely extends between the upper ends of the legs to connect the legs to each other adjacent their upper ends and space the upper ends of the legs apart by a given distance. Each of the legs also has an opposite lower end which is adapted to enter the respective workpieces which are to be fastened together. The fastener is positioned with the lower end of one leg in contact with one of the workpieces and the lower end of the other leg in contact with the other workpiece, and the fastener is then forcibly driven into the respective workpieces by a driving element which acts upon the crown in a manner to attempt or tend to shorten the distance between the upper end of at least one of the legs and the other leg. This will create continuing forces which tend to continue to urge the respective workpieces together after the fastener has been driven.

In another principal aspect of the present invention, the attempt to shorten the distance is produced by bending the fastener crown.

In still another principal aspect of the present invention, the crown is bent adjacent the upper end of at least one of the legs to urge the upper end of that leg toward the other leg.

In still another principal aspect of the present invention, the crown is bent intermediate the upper ends of both of the legs to urge the upper ends of the legs toward each other.

In still another principal aspect of the present invention, the bending of the crown is achieved by at least one projection extending from an edge of the driving element of a powered driving head toward and into contact with the fastener crown, and the projection forcibly drives the crown into the workpieces while at the same time tending to bend the crown.

In still another principal aspect of the present invention, the bent portions of the crown are countersunk into the workpieces.

In still another principal aspect of the present invention, prior to being driven into the workpieces the legs of the fastener are closer to each other adjacent the ends at which they are attached to the crown than at the opposite ends to produce, at least in part, the continuing forces which tend to continue to urge the respective workpieces together after the fastener has been driven.

In still another principal aspect of the present invention, a stick is formed of a plurality of generally U-shaped fasteners which are arranged in serial adjacent relationship to each other and along a longitudinal axis. Each of the fasteners comprises a pair of elongate legs spaced from each other and depending at one end from, attached to and extending at a substantial angle from the opposite ends of a crown which extends transversely between the ends of the legs of each of the fasteners. Both of the legs and the crown of each fastener are located in a plane, the planes of adjacent fasteners are substantially parallel to each other, and the longitudinal axis extends at an acute angle to the planes of the fasteners.

In still another principal aspect of the present invention, the two workpieces fastened together are wood construction pieces.

In still another principal aspect of the present invention, the two workpieces may each include planar faces in which the planes of the respective faces are either parallel to each other, coplanar to each other, or extend at a substantial angle to each other, and the legs of the fastener may be inserted through each of the respective planes with the crown of the fastener extending between the respective planes to fasten the two workpieces together.

These and other objects, features and advantages of the present invention will be more clearly understood through a consideration of the following detailed description.

BRIEF DESCRIPTION OF THE DRAWINGS

In the course of this description reference will frequently be made to the attached drawings in which:

FIG. 1 is an overall, partially exploded and broken perspective view of a powered driving tool positioned to fasten together a pair of workpieces in accordance with the principles of the present invention, in which the fastener is to span generally coplanar faces of the workpieces which are to be fastened together, and in which a stick of fasteners in accordance with the invention is shown for illustration as exploded from the tool;

FIG. 2 is a partially broken enlarged view of the stick of fasteners substantially as shown exploded in FIG. 1, and ready for insertion into the powered driving tool of FIG. 1;

FIG. 3 is a broken, cross-sectioned side elevation view of the workpieces and a fastener and showing a first embodiment of fastener and driving element in accordance with the principles of the present invention, and as substantially viewed along line 3—3 of FIG. 1;

FIG. 4 is a broken, cross-sectioned side elevation view similar to FIG. 3 and showing the embodiment of fastener and driving element shown in FIG. 3, but with the fasteners installed from a different aspect and spanning the planar faces of the workpieces which instead of being substantially coplanar to each other as in FIGS. 1 and 3, are at a substantial angle to each other;

FIG. 5 is a broken, cross-sectioned side elevation view of the workpieces having coplanar faces and having a driving element both of which are similar to FIG. 3, but showing a second embodiment of fastener in accordance with the principles of the present invention;

FIG. 6 is a broken, cross-sectioned side elevation view similar to FIG. 5 and showing the embodiment of fastener and driving element shown in FIG. 5, but with the fasteners installed from a different aspect and spanning the planar faces of the workpieces which instead of being substantially coplanar to each other as in FIG. 5, are at a substantial angle to each other;

FIG. 7 is a broken, cross-sectioned side elevation view of the workpieces having coplanar faces and having a fastener both of which are similar to FIG. 3, but showing a second embodiment of driving element in accordance with the principles of the present invention;

FIG. 8 is a broken, cross-sectioned side elevation view similar to FIG. 7 and showing the embodiment of fastener and driving element shown in FIG. 7 but with the fasteners installed from a different aspect and spanning the planar faces of the workpieces which instead of being substantially coplanar to each other as in FIG. 7, are at a substantial angle to each other;

FIG. 9 is a broken, cross-sectioned side elevation view of the workpieces having coplanar faces and having a fastener both of which are similar to FIG. 3, but showing a third embodiment of driving element in accordance with the principles of the present invention; and FIG. 10 is a broken, cross-sectioned side elevation view similar to FIG. 9 and showing the embodiment of fastener and driving element shown in FIG. 9, but with the fasteners installed from a different aspect and spanning the planar faces of the workpieces which instead of being substantially coplanar to each other as in FIG. 9, are at a substantial angle to each other.

DESCRIPTION OF THE PREFERRED EMBODIMENTS

A powered driving tool, generally 10, is shown in FIG. 1 and which comprises a motor housing 12 for containing some form of motor, piston or other driving component (not shown) for forcibly driving the fasteners of and in accordance with the present invention as will be described in further detail below. The motor in the motor housing 12 may be driven by any one of a number of conventional power sources, including for example pressurized fluid, electrical or combustion power sources. For purposes of illustration only, a pneumatic fitting 14 is shown in FIG. 1 for communicating a source (not shown) of high pressure air of for example 110 psi through a handle 16 of the powered driving head. The handle 16 is preferably provided for manually positioning and holding the powered driving tool 10 relative to the workpieces which are to be fastened together so that the fastening function as will be described further below, may be easily and efficiently performed.

The powered driving tool 10 also preferably includes a magazine 18 for receiving and positioning a stick 20 of a plurality of fasteners 22 for use in accordance with the invention, and as seen in FIGS. 1 and 2. The fasteners 22 of the present invention are preferably generally U-shaped and staple-like in nature as best seen in the drawings. The powered driving tool 10 also includes a driving element 24 which is positioned to be driven by the motor in motor housing 12 in a manner so as to reciprocate to drive the fasteners 22 sequentially and one at a time from the stick 20 into the workpieces 26 and 28 which are to be fastened together as shown in the drawings.

As best seen in FIG. 1, the powered driving tool 10 may include a cover plate 30 behind which the lead fastener 22 in the stick 20 is positioned in readiness for being forcibly separated from the stick and driven into the workpieces 26 and 28 to be fastened together. The cover plate 30 is preferably approximately the same width as the fastener 22 and may provide any one of several functions. One function is to position the lead fastener 22 in the stick 20 in position for driving. Another is to provide a safety shield to prevent possible injury to the operator of the powered driving head 10, and define the leading end of the magazine 18. Still another is to permit accurate positioning of the powered driving tool 10 relative to the workpieces prior to driving the fastener by contacting and resting the lower edge 32 of the cover plate 30 on the workpieces 26 and 28 as shown in FIG. 1. Once the powered driving tool 10 has been positioned in its desired location, it may be actuated by a suitable trigger 34 or the like to forcibly separate the lead fastener which is positioned just behind the cover plate 30 and drive it into the workpieces 26 and 28.

The magazine 18 is preferably angled relative to the motor housing 12, as shown in FIG. 1, to facilitate the manual manipulation and positioning of the powered driving tool 10 relative to the workpieces 26 and 28 to be fastened together. This angular configuration relative to the motor housing 12 and driving element 24 is particularly advantageous where the powered driving tool 10 is to be positioned so as to drive the fasteners between the faces of respective workpieces which are positioned at a substantial angle to each other for example as shown in FIG. 4. Although angular positioning of the magazine 18 is preferred, it will be understood that the magazine 18 and motor housing 12 may be positioned at right angles, without departing from the spirit and scope of the present invention. It will also be understood that some form of conventional spring or the like (not shown) may be provided in the magazine 18 to urge the stick 20 of fasteners forward so that they are properly, automatically and sequentially positioned for driving by the driving element 24.

With particular reference to FIGS. 1–4, a first preferred embodiment of generally U-shaped, staple-like fastener 22 of the present invention comprises a pair of elongate spaced legs 36 and 38 which are spaced from and extend generally parallel to each other as best seen in FIG. 3. The upper ends 40 and 42 of the respective legs 36 and 38 of the U-shaped, staple-like fastener 22 are connected by a crown 44 which is connected at its ends 46 and 48 to the upper ends 40 and 42, respectively, of the legs 36 and 38 of the fastener. The bottom ends 50 and 52 of the fastener 22 opposite the upper ends 40 and 42, respectively, are preferably cut or otherwise formed to a sharp point, as best seen in FIGS. 3 and 4, to facilitate their forcible entry into the workpieces 26 and 28.

A first embodiment of driving element 24 of the invention is shown in FIGS. 1–4 for driving the fasteners 22. The driving element 24 has a lower edge 54, as best seen in FIGS. 3 and 4, which is adapted to align with the crown 44 of the leading fastener 22 which is to be next driven by the powered driving head 10 as seen in FIG. 1. This lower edge 54, according to the first embodiment of driving element 24 of the present invention, includes a pair of spaced projections 56 and 58 which extend downwardly from and at each of the ends of the lower edge. The projections 56 and 58 are each shorter than the length of the crown 44 in the direction parallel to the crown 44. The projections 56 are positioned to contact the crown ends 46 and 48, respectively, of the fastener 22, as best seen in FIGS. 3 and 4, and overlie the elongate legs 36 and 38 of the fastener. Because of this positioning, the legs 36 and 38 are directly driven into the workpieces 26 and 28, as best seen in FIGS. 3 and 4 by forces shown by the solid arrows f.

Accordingly, the forces f generated by the powered driving tool 10 and transmitted through the projections 56 and 58 are concentrated of forces directly over the legs 36 and 38. This concentration of forces produces several advantageous results of the present invention. One is to rapidly and directly drive the legs 36 and 38 into the workpieces 26 and 28. Secondly, by concentrating the forces exerted by the powered driving tool 10 in the projections 56 and 58, rather than along the whole linear length of the edge 54 of the driving element 24, recoil in the powered driving tool 10 is substantially reduced.

A third and important result of the spaced projections 56 and 58 is that once the legs 36 and 38 of the fastener have been driven into the respective workpieces 26 and 28, the concentrated forces shown by the solid arrows f in FIG. 3 which are directed through the projections 56 and 58 will tend to bend the crown 44 of the fastener in the manner to assume the crown shape 44A shown in FIG. 3. Although substantial bending of the crown in this manner is greatly restricted and virtually precluded because the elongated legs 36 and 38 already have been driven over their length into the material of the workpieces, some bending will occur due to the resilience of the workpiece material, which typically is wood. Thus, the distance between the upper ends 40 and 42 of the fastener legs 36 and 38, along with the corresponding ends 46 and 48 of the crown 44 will tend or attempt to shorten and they will be countersunk into the respective workpieces 26 and 28, as seen in FIGS. 3 and 4. This bending action on the crown 44 of the fastener 22 and/or countersinking which tends to shorten the distance between the respective upper ends 40 and 42 of the legs 36 and 38 is minimized due to the resistance resulting from the density of the workpiece materials as stated, substantial forces F instead will be set up in the workpieces 26 and 28 as shown by the hollow arrows in FIGS. 3 and 4. As will be seen in FIGS. 3 and 4, these forces F are exerted either directly in a direction or which will have a substantial component in a direction which tends to urge the two workpieces 26 and 28 which are spanned by the fastener 22 further together with a continuing force after the fastener 22 has been forcibly driven into the workpieces.

With particular reference to FIG. 1, the workpieces 26 and/or 28 may be formed of any number of widely varying materials which are capable of receiving the forcibly driven fasteners 22 and which will retain the fasteners after they have been forcibly driven in a manner to hold the workpieces together. With particular reference to FIG. 1, the workpieces may typically be formed of a generally fibrous and/or cellular material, such as wood and, more specifically, may be wood construction materials such as where workpiece 26 is a sill plate or piece and workpiece 28 is a stud and where the workpieces are to be assembled and fastened together in the construction of a wall of a building structure.

Also with particular reference to FIGS. 1, 3 and 4, the workpieces 26 and 28 may be generally rectangular in cross-section, with workpiece 26 having at least two generally planar faces 60 and 61, and workpiece 28 also having at least two generally planar faces 62 and 63. Referring to FIGS. 1 and 3, the planar faces 60 and 62 of the workpieces 26 and 28 may be arranged so that they are parallel and/or coplanar to each other, and the fastener 22 may be positioned to extend across and fastened through these two parallel and/or coplanar faces 60 and 62. In another preferred alternative, the fastener 22 extends between and fastens the planar faces 61 and 63 of the respective workpieces 26 and 28 which are arranged at a substantial angle to each other as seen in FIG. 4. For example, this would be typical in the fastening of sill plate and stud workpieces respectively in a building construction to form a wall. In the fastening of such building construction elements as seen in FIG. 4, one or more fasteners 22 are preferably forcibly counterdriven on each side of the workpiece 28 to maximize the fastening strength.

It has been found that the utilization of the U-shaped, staple-like fasteners of the present invention together with the manner of forcibly driving the fasteners as just described in which a continuing force will be exerted between the workpieces which have been fastened due to the attempt or tendency to shorten the fastener crowns 44 by bending, will result in a substantially stronger and stationary fastening between the workpieces than where either nails or staples as in the past are simply used. Moreover, the strength and rigidity of joinder is also substantially improved where the U-shaped fasteners 22 are driven, as shown in FIG. 4, so that their crowns 44 extend between the angular planar faces 61 and 63. These stronger fastenings will permit extensive transport and handling of preassembled prefabricated structures, such as building walls, without slippage, movement, separation or misalignment of the workpieces relative to each other.

With further particular reference to FIGS. 1 and 2, the fasteners 22 of the present invention, as previously mentioned, are preferably arranged into a stick form for ease of handling and use, and in which plural fasteners 22 are sequentially fixed to each other as best seen in FIG. 2 to form the stick 20. This facilitates the positioning of the fastener sticks 20 in the magazine 18 of the powered driving head 10, and also sequentially positions the respective fasteners 22 so that they may be forcibly driven one by one in the proper orientation into the workpieces 26 and 28 by the driving element 24.

The stick 20 of fasteners 22 is preferably assembled along a longitudinal axis a—a, as seen in FIG. 2, and the plane p—p of each of the fasteners 22 preferably extends at an angle to the axis a—a as shown. This permits the stick 20 to be inserted into and positioned in the angularly disposed magazine 18 as shown in FIG. 1, and yet the fasteners 22 will be substantially vertically disposed in a vertical plane p—p in readiness for the sequential driving of the fasteners 22 vertically into the workpieces 26 and 28. Although the respective adjacent fasteners 22 may be formed in an integrally stamped attached manner in which sticks of staples are otherwise typically formed, it is preferred that the individual fasteners 22 be independently formed, then oriented with their planes p—p parallel to each other and at an angle to axis a—a, and then attached together by an elongate strip of adhesive tape 64, as shown in FIG. 2. Alternatively, the adjacent fasteners 22 may be attached together simply by any one of a number of known adhesives 66 which may be topically applied, as shown in FIGS. 3 and 4, to the legs 36 and 38 of each of the fasteners. This adhesive 66 may also be utilized to firmly anchor the fasteners in the workpieces once they have been forcibly driven. If desired when used for the last mentioned function, the adhesive 66 may be responsive to the heat that is generated during the driving of the fasteners to reduce its stickiness during driving and restore it upon cooling.

FIGS. 5 and 6 are substantially identical to FIGS. 3 and 4, except that a somewhat modified second embodiment of fastener 22' is shown in FIGS. 5 and 6. As in the case of FIG. 3, FIG. 5 depicts the workpieces 26 and 28 having coplanar faces 60 and 62 with the crown 44 of the fastener 22' spanning these coplanar faces. As in the case of FIG. 4, FIG. 6 depicts planar faces 61 and 63 of the workpieces 26 and 28, respectively, in which the planar faces extend at a substantial angle to each other, and in which the crowns 44 of the fasteners 22' span these planar faces which are at a substantial angle to each other. Because many of the components shown in FIGS. 5 and 6 are substantially identical to those already explained in reference to FIGS. 3 and 4, like reference numerals will be used to identify like components for purposes of simplicity.

In the second embodiment of fastener 22' shown in FIGS. 5 and 6, the principal difference is that the legs 36' and 38' of the fastener are preferably angled outwardly somewhat rather than extending parallel to each other as do the legs shown in FIGS. 3 and 4. The legs 36' and 38' are angled outwardly somewhat from each other so that their bottom ends 50 and 52 are further apart than their top ends 40 and 42 prior to being driven into the workpieces. Therefore, as the legs 36' and 38' are being forcibly driven into the workpieces by the powered driving tool 10 and driving element 24, the distance between the legs will tend to progressively decrease as the fastener 22' enters the workpieces. However, due to the density of the material of the workpieces 26 and 28, the legs 36' and 38' will be substantially restrained from moving toward or closer to each other. However, this will set up substantial forces as previously described and which tend or attempt to force the two workpieces 26 and 28 together and which contribute to the forces F as shown by the hollow arrows in FIGS. 5 and 6. It will also be appreciated that these forces will continue to be exerted after driving of the fasteners 22' has been completed.

The driving element 24, as shown in FIGS. 5 and 6, is substantially identical to the driving element shown in FIGS. 3 and 4. Accordingly, the forces f as shown in FIGS. 5 and 6 will also tend to bend the crown 44 to assume the configuration 44A as shown in FIGS. 5 and 6, and to countersink the ends of the legs 40 and 42 and ends 46 and 48 of the crown 44A into the workpieces 26 and 28 as previously described. This will also contribute to the forces F as shown in FIGS. 5 and 6 and which also tend to force the workpieces together as previously described.

FIGS. 7 and 8 are also substantially identical to FIGS. 3 and 4, except that a somewhat modified second embodiment of driving element 24' is shown in FIGS. 7 and 8. As is the case of FIG. 3, FIG. 7 depicts the workpieces 26 and 28 having coplanar faces 60 and 62 with the crown 44 of the fastener 22 spanning these coplanar faces. As in the case of FIG. 4, FIG. 8 depicts planar faces 61 and 63 of the workpieces 26 and 28, respectively, in which the planar faces extend at a substantial angle to each other, and in which the crowns 44 of the fasteners 22 span these planar faces which are at a substantial angle to each other. Because many of the components shown in FIGS. 7 and 8 are substantially identical to those already explained in reference to FIGS. 3 and 4, like reference numerals will be used to identify like components for purposes of simplicity.

In the second embodiment of driving element 24' shown in FIGS. 7 and 8, the principal difference is that an additional projection 68 has been added intermediate the projections 56 and 58. Projection 68 also is positioned to extend downward and into contact with the crown 44 of the fastener 22, but intermediate the ends 46 and 48 of the crown. The projection 68 extends downward from the edge 54 of the driving element 24' preferably for about the same distance as the other projections 56 and 58, and more preferably for a slightly greater distance than the projections 56 and 58 as shown in FIGS. 7 and 8. Accordingly, the forces f as shown in FIGS. 7 and 8 will tend to bend the crown 44 to assume the configuration 44B as shown in FIGS. 7 and 8. This bending will first begin intermediate the ends 46 and 48 of the crown and then at the ends of the crown. This will result in countersinking of the middle 70 of the crown and also the ends 40 and 42 of the legs 36 and 38 and ends 46 and 48 of the crown into the workpieces 26 and 28. Again, this bending and countersinking will produce the forces F, as shown by the hollow arrows in FIGS. 7 and 8, and which tend to force the workpieces together, as previously described, and after the driving of the fasteners has been completed.

FIGS. 9 and 10 are substantially identical to FIGS. 7 and 8, except that a somewhat modified third embodiment of driving element 24" is shown in FIGS. 9 and 10. As in the case of FIG. 7, FIG. 9 depicts the workpieces 26 and 28 having coplanar faces 60 and 62 with the crown 44 of the fastener 22 spanning these coplanar faces. As in the case of FIG. 8, FIG. 10 depicts planar faces 61 and 63 of the workpieces 26 and 28, respectively, in which the planar faces extend at a substantial angle to each other, and in which the crowns 44 of the fasteners 22 span these planar faces which are at a substantial angle to each other. Because many of the components shown in FIGS. 9 and 10 are substantially identical to those already explained in reference to FIGS. 7 and 8, like reference numerals will be used to identify like components for purposes of simplicity.

In the third embodiment of driving element 24" shown in FIGS. 9 and 10, the principal difference is that the projection 68 has been added intermediate the length of edge 54 of the driving element 24', but the projections 56 and 58 have been eliminated. As in the second embodiment of driving element 24', projection 68 in this embodiment of driving element 24" is positioned to extend downward and into contact with the crown 44 of the fastener 22 intermediate the ends 46 and 48 of the crown. Accordingly, the force f as shown in FIGS. 9 and 10 will tend to bend the crown 44 to assume the configuration 44C as shown in FIGS. 9 and 10 intermediate the ends 46 and 48 of the crown. This will result in countersinking of the middle 70 of the crown as in the last described second embodiment. However, due to the absence of the end projections 56 and 58, the ends 40 and 42 of the legs 36 and 38, and ends 46 and 48 of the crown will not be substantially bent or countersunk as in the second embodiment of driving element. The bending and countersinking of the middle 70 of the crown 44 again will produce the forces F, as shown in FIGS. 9 and 10 by the hollow arrows, and which tend to force the workpieces 26 and 28 together as previously described.

Although fasteners in which the legs 36 and 38 and/or crown 44 are from about 1–2 inches in length have been found to be quite functional for attaching and holding construction workpieces of wood for the assembly of building walls, smaller or larger fasteners may be employed either for the same or other uses.

From the foregoing, it will be appreciated that in the present invention a continuing force is made possible which can be exerted after the driving of a fastener has ceased, and which force will tend to urge the two workpieces together in their fastened condition. The existence of this continuing force will function to firmly hold the workpieces together after fastening and during handling and use of the fastened workpieces. This will substantially reduce any tendency or possibility of relative movement between the two workpieces after they have been fastened together, and any misalignment or separation of the workpieces due to such movement. It will also be appreciated that these continuing forces may be easily and readily accomplished utilizing generally previously known and available fasteners, and the forces may be accomplished without the need to employ complex or expensive specially constructed tools or procedures, and while minimizing recoil during forcible driving placement of the fasteners.

It will be understand that although certain embodiments of fasteners 22 and 22' have been shown and described as used in conjunction with certain driving elements 24, 24' and 24", it is not necessary that a particular embodiment of fastener be used with the particular embodiment of driving element with which it is shown herein. Any of the driving elements may be used with any of the fasteners. For example, even though driving element 24 is shown in FIGS. 5 and 6 as used in conjunction with fastener 22', either driving element 24 and 24" could also be used with fastener 22'.

It will also be understood that the preferred embodiments of the present invention which have been described are merely illustrative of the principles of the present invention. Modifications may be made by those skilled in the art without departing from the true spirit and scope of the invention.

I claim:

1. A stick of a plurality of generally U-shaped fasteners arranged in serial adjacent relationship to each other and along a longitudinal axis, each of said fasteners comprising a pair of elongate legs spaced from each other and depending at one end from, attached to and extending at a substantial angle from the opposite ends of a crown which extends transversely between the ends of the legs of each of the fasteners, both of said legs and said crown of each fastener being located in a plane, and wherein the planes of adjacent fasteners are substantially parallel to each other and said longitudinal axis extends at an acute angle to the planes of said fasteners.

2. The stick of fasteners of claim 1, wherein the legs of each said fastener are closer to each other adjacent said ends which are attached to the crown than the opposite ends of the legs.

3. The stick of fasteners of claim 1, including at least one adhesive element extending substantially parallel to said longitudinal axis to hold the plurality of fasteners in the stick form.

4. The stick of fasteners of claim 1, including an adhesive on at least a portion of the length of the legs of the fasteners.

* * * * *

UNITED STATES PATENT AND TRADEMARK OFFICE
CERTIFICATE OF CORRECTION

PATENT NO. : 6,071,053  
DATED : June 6, 2000  
INVENTOR(S) : Philip A. Kuhns

Page 1 of 1

It is certified that error appears in the above-identified patent and that said Letters Patent is hereby corrected as shown below:

<u>Title page,</u>
*Attorney, Agent, or Firm* should read
-- Cook, Alex, McFarron, Manzo, Cummings & Mehler, Ltd. --.

<u>Column 4,</u>
Line 6, after "7" a comma -- , -- should be inserted.

<u>Column 9,</u>
Line 22, "24'" should be -- 24" --.

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,071,053
DATED         : June 6, 2000
INVENTOR(S)   : Philip A. Kuhns It is certified that error appears in the above-identified patent and that said Letters Patent is hereby corrected as shown below:

<u>Column 1,</u>
Line 49, the period "." should be deleted.

Signed and Sealed this

Sixteenth Day of December, 2003

JAMES E. ROGAN
*Director of the United States Patent and Trademark Office*